(12) United States Patent
Oyobe et al.

(10) Patent No.: US 7,582,979 B2
(45) Date of Patent: Sep. 1, 2009

(54) ELECTRIC POWER SUPPLY SYSTEM

(75) Inventors: Hichirosai Oyobe, Toyota (JP);
Tetsuhiro Ishikawa, Nishikamo-gun (JP); Yukihiro Minezawa, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 120 days.

(21) Appl. No.: 11/920,056

(22) PCT Filed: May 16, 2006

(86) PCT No.: PCT/JP2006/310101

§ 371 (c)(1),
(2), (4) Date: Nov. 8, 2007

(87) PCT Pub. No.: WO2006/132070

PCT Pub. Date: Dec. 14, 2006

(65) Prior Publication Data

US 2009/0058097 A1 Mar. 5, 2009

(30) Foreign Application Priority Data

Jun. 8, 2005 (JP) ............................. 2005-168023

(51) Int. Cl.
*F02B 63/04* (2006.01)
*G06F 17/00* (2006.01)
*H02J 7/00* (2006.01)
*H01M 8/00* (2006.01)

(52) U.S. Cl. .......................... 290/1 R; 429/12; 429/13; 701/22; 320/109

(58) Field of Classification Search ................. 290/1 R, 290/4 A, 4 R, 1 A; 429/12, 13; 701/22, 36; 705/412; 320/109
See application file for complete search history.

(56) References Cited

U.S. PATENT DOCUMENTS

| 5,767,584 | A | 6/1998 | Gore et al. |
| 6,107,691 | A | 8/2000 | Gore et al. |
| 6,649,289 | B2 * | 11/2003 | Hsu et al. ...................... 429/13 |
| 7,141,321 | B2 * | 11/2006 | McArthur et al. .............. 429/12 |

(Continued)

FOREIGN PATENT DOCUMENTS

JP    A 4-295202    10/1992

(Continued)

OTHER PUBLICATIONS

Kempton, W. et al., "Vehicle-to-grid power fundamentals: Calculating capacity and net revenue," *Journal of Power Sources*, vol. 144, No. 1, pp. 268-279 (2005).

(Continued)

*Primary Examiner*—Julio Gonzalez
(74) *Attorney, Agent, or Firm*—Oliff & Berridge, PLC

(57) ABSTRACT

Vehicles are connected to respective receptacles of houses and are capable of generating commercial AC power to supply the generated electric power to a power transmission line. The vehicles communicate with a management server via the houses and the power transmission line. The vehicles output to the management server such information items concerning the vehicles as vehicle ID, amount of generated electric power and remaining amount of fuel. When electric power shortage occurs, the management server generates a start command and a power generation command for the vehicles based on the information concerning the vehicles to output the generated commands to the vehicles.

10 Claims, 6 Drawing Sheets

U.S. PATENT DOCUMENTS

| | | | |
|---|---|---|---|
| 2008/0040295 A1* | 2/2008 | Kaplan et al. | 705/412 |
| 2008/0077286 A1* | 3/2008 | Oyobe et al. | 701/22 |
| 2008/0169651 A1* | 7/2008 | Oyobe et al. | 290/7 |
| 2009/0091291 A1* | 4/2009 | Woody et al. | 320/109 |
| 2009/0096416 A1* | 4/2009 | Tonegawa et al. | 320/109 |
| 2009/0115251 A1* | 5/2009 | Nakamura et al. | 307/32 |

FOREIGN PATENT DOCUMENTS

| | | | |
|---|---|---|---|
| JP | A 2001-8380 | 1/2001 |
| JP | A 2002-8673 | 1/2002 |
| JP | A 2003-164064 | 6/2003 |

OTHER PUBLICATIONS

Sutanto, D., "Alternative Energy Resource from Electric Transportation," *Power Electronics Systems and Applications*, pp. 149-154 (2004).

* cited by examiner

ELECTRIC POWER SUPPLY SYSTEM

TECHNICAL FIELD

The present invention relates to an electric power supply system. In particular, the invention relates to an electric power supply system that uses a vehicle capable of generating commercial AC power and supplying the generated commercial AC power to the outside of the vehicle.

BACKGROUND ART

Japanese Patent Laying-Open No. 04-295202 discloses an electric motor drive and power processing apparatus used in electrically powered vehicles. The electric motor drive and power processing system includes a secondary battery, inverters IA, IB, induction motors MA, MB, and a control unit. Induction motors MA, MB include respective windings CA, CB in a Y configuration, and windings CA, CB have neutral nodes NA, NB connected via an EMI filter to an input/output port.

Inverters IA, IB are provided correspondingly to induction motors MA, MB respectively and connected respectively to windings CA, CB. Further, inverters IA, IB are connected in parallel with the secondary battery.

In the electric motor drive and power processing apparatus, inverters IA, IB can generate sinusoidal and regulated AC power across neutral points NA, NB, and supply the generated AC power to external devices connected to the input/output port.

The electric motor drive and power processing system disclosed in Japanese Patent Laying-Open No. 04-295202 is useful in that it has the power supply capability to generate AC power and supply the generated AC power to external devices. Japanese Patent Laying-Open No. 04-295202, however, does not particularly consider an electric power supply system that provides a reverse flow of its generated AC power to a commercial electric power system and that totally manages electric power supply from a plurality of vehicles connected to the commercial electric power system.

DISCLOSURE OF THE INVENTION

The present invention is made to solve the aforementioned problem, and an object of the invention is to provide an electric power supply system capable of managing electric power supply from vehicles having the power-supply capability and connected to a commercial electric power system.

According to the present invention, an electric power supply system includes: at least one vehicle capable of generating commercial electric power to supply the generated commercial electric power to the outside of the vehicle; at least one connection apparatus provided correspondingly to the at least one vehicle and connecting the at least one vehicle to a commercial electric power system; and a management apparatus managing electric power generation by the at least one vehicle connected to the commercial electric power system. The at least one vehicle each outputs information concerning the vehicle to the management apparatus. Based on the information about the vehicle, the management apparatus makes a request to the vehicle outputting the information to generate commercial electric power. The at least one vehicle each generates the commercial electric power according to the request from the management apparatus and outputs, via the corresponding connection apparatus, the generated commercial electric power to the commercial electric power system.

In the electric power supply system of the present invention, the management apparatus obtains, from the vehicle connected by the connection apparatus to the commercial electric power system, information concerning the vehicle. Based on the obtained information concerning the vehicle, the management apparatus can search for and find the vehicle connected to the commercial electric power system and having the capability to supply electric power, so as to request the vehicle to generate electric power.

Thus, with the electric power supply system of the present invention, in the case where electric power shortage of the commercial electric power system occurs, the vehicle connected to the commercial electric power system and capable of supplying electric power can be used to supply electric power to the commercial electric power system. Accordingly, the shortage of electric power of the commercial electric power system can be made up for.

Preferably, the at least one vehicle each includes: an electric power generation apparatus generating the commercial electric power; a communication apparatus communicating with the management apparatus; and a control apparatus. The control apparatus outputs the information about the vehicle via the communication apparatus to the management apparatus and instructing, according to the request from the management apparatus that is received via the communication apparatus, the electric power generation apparatus to generate the commercial electric power.

Still preferably, the communication apparatus communicates with the management apparatus via the corresponding connection apparatus and the commercial electric power system.

In the electric power supply system, the communication apparatus communicates with the management apparatus via the corresponding connection apparatus and the commercial electric power system. Therefore, it is unnecessary to separately provide a communication-dedicated line. Thus, this electric power supply system can be used to reduce the communication cost.

Preferably, the electric power generation apparatus includes: an internal combustion engine; and an electric power generation unit using electric power generated by means of power of the internal combustion engine to generate the commercial electric power. The information concerning the vehicle includes a remaining amount of fuel for driving the internal combustion engine. When the remaining amount becomes equal to or smaller than a predetermined amount, the management apparatus instructs the vehicle to stop generating the commercial electric power.

In the electric power supply system, the vehicle is a hybrid vehicle having as its motive power sources the internal combustion engine and an electric motor. The commercial electric power is generated using electric power generated from power of the internal combustion engine. Here, when the remaining amount of fuel of the internal combustion engine becomes equal to or smaller than a predetermined amount (e.g. the fuel level at which a low-fuel-level warning light comes on or fuel level set by a user), the management apparatus instructs the vehicle to stop generating the commercial electric power. Thus, for the vehicle supplying the commercial electric power, fuel that is necessary for running to the minimum extent is secured. Accordingly, the vehicle can run at least to the nearest fuel station.

Preferably, the electric power generation apparatus includes: a fuel cell; and an electric power generation unit using electric power that is output from the fuel cell to generate the commercial electric power. The information concerning the vehicle includes a remaining amount of fuel of the fuel cell. When the remaining amount becomes equal to or smaller than a predetermined amount, the management apparatus instructs the vehicle to stop generating the commercial electric power.

In the electric power supply system, the vehicle is a fuel cell vehicle having a fuel cell mounted thereon. The commercial electric power is generated using electric power output from the fuel cell. Here, when the remaining amount of fuel of the fuel cell becomes equal to or smaller than the predetermined amount, the management apparatus instructs the vehicle to stop generating the commercial electric power. Thus, for the vehicle supplying the commercial electric power, fuel that is necessary for running to the minimum extent is secured. Accordingly, with this electric power supply system, the vehicle can run at least to the nearest fuel station.

Preferably, a plurality of vehicles are connected to the commercial electric power system. According to an amount of electric power shortage of the commercial electric power system, the management apparatus selects from these plurality of vehicles a vehicle that is to be requested to supply the commercial electric power.

In the electric power supply system, the management apparatus controls the number of vehicles to be requested to supply the commercial electric power, among a plurality of vehicles. Thus, electric power can be secured according to demands (shortage of electric power). Accordingly, the electric power supply system can be used to supply an appropriate amount of electric power from the vehicles.

As seen from the above, the present invention can manage supply of electric power from a vehicle having the power supply capability and connected to a commercial electric power system. When electric-power shortage of the commercial electric power system occurs, the vehicle connected to the commercial electric power system and having the electric power supply capability can be used to supply the commercial electric power system with electric power. Accordingly, the shortage of electric power of the commercial electric power system can be overcome.

BEST MODES FOR CARRYING OUT THE INVENTION

Figure 1:
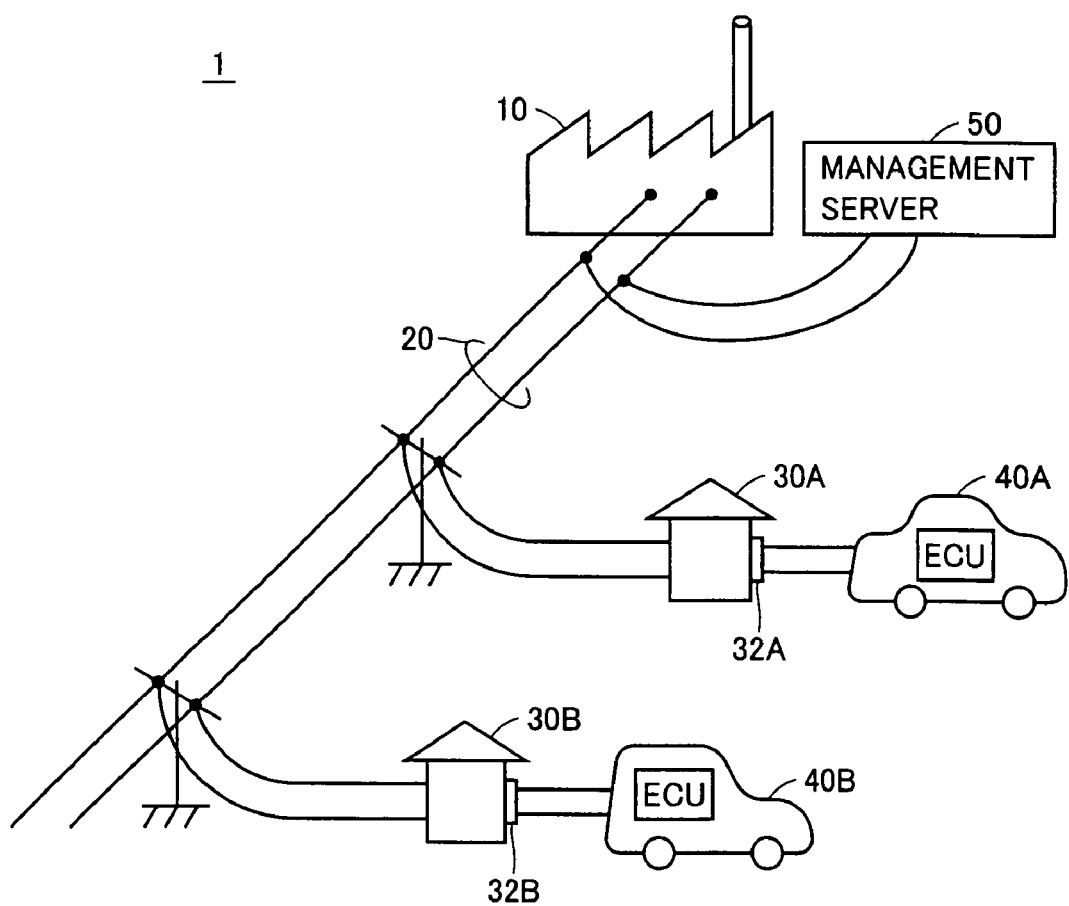
FIG. 1 is an entire block diagram of an electric power supply system according to an embodiment of the present invention.

Embodiments of the present invention are hereinafter described in detail with reference to the drawings. It is noted that like or corresponding components are denoted by like reference characters and a description thereof is not repeated.

FIG. 1 is an entire block diagram of an electric power supply system according to an embodiment of the present invention. Referring to FIG. 1, this electric power supply system 1 includes a power station 10, a power transmission line 20, houses 30A, 30B, vehicles 40A, 40B, and a management server 50.

Power station 10 generates commercial electric power to output the generated commercial electric power to power transmission line 20. Houses 30A, 30B are connected to power transmission line 20 to receive the commercial electric power as supplied from power transmission line 20. Further, houses 30A, 30B receive, from vehicles 40A, 40B respectively, commercial electric power generated by vehicles 40A, 40B, and output the commercial electric power as received to power transmission line 20.

Vehicles 40A, 40B are each a hybrid vehicle. Vehicle 40A is connected to a receptacle 32A of house 30A. Vehicle 40A generates commercial electric power by a method described hereinlater to output the generated commercial electric power to receptacle 32A of house 30A. Further, vehicle 40A communicates, via receptacle 32A, house 30A and power transmission line 20, with management server 50 connected to power transmission line 20.

Specifically, when vehicle 40A is connected to receptacle 32A of house 30A, vehicle 40A outputs information concerning vehicle 40A to management server 50. The information concerning vehicle 40A includes such information items as vehicle ID number for identifying vehicle 40A by management server 50, power generable signal indicating that electric power can be generated, amount of generated electric power, and remaining amount of fuel. Further, vehicle 40A receives from management server 50 such commands issued to vehicle 40A as start command, power generation command that is a command to generate electric power, and stop command, and operates according to a received command.

Vehicle 40B is connected to a receptacle 32B of house 30B. Vehicle 40B has the same capabilities as those of vehicle 40A, and the description thereof is not repeated.

Management server 50 is connected to power transmission line 20. Management server 50 communicates via power transmission line 20 with vehicles 40A, 40B connected to this electric power supply system 1, and manages electric power generation by vehicles 40A, 40B. Specifically, when electric power shortage occurs, management server 50 detects vehicles 40A, 40B connected to electric power supply system 1 to output the start command and the power generation command to vehicle 40A and/or vehicle 40B according to an amount of electric power shortage.

Further, management server 50 outputs the stop command to a vehicle that is generating electric power, when the electric power shortage is overcome or when management server 50 detects, from information about the vehicle, that the amount of fuel left in the vehicle which is generating electric power is equal to or smaller than a preset reference value (for example the fuel level at which a low-fuel-level warning light comes on, or fuel level set by a user).

Figure 2:
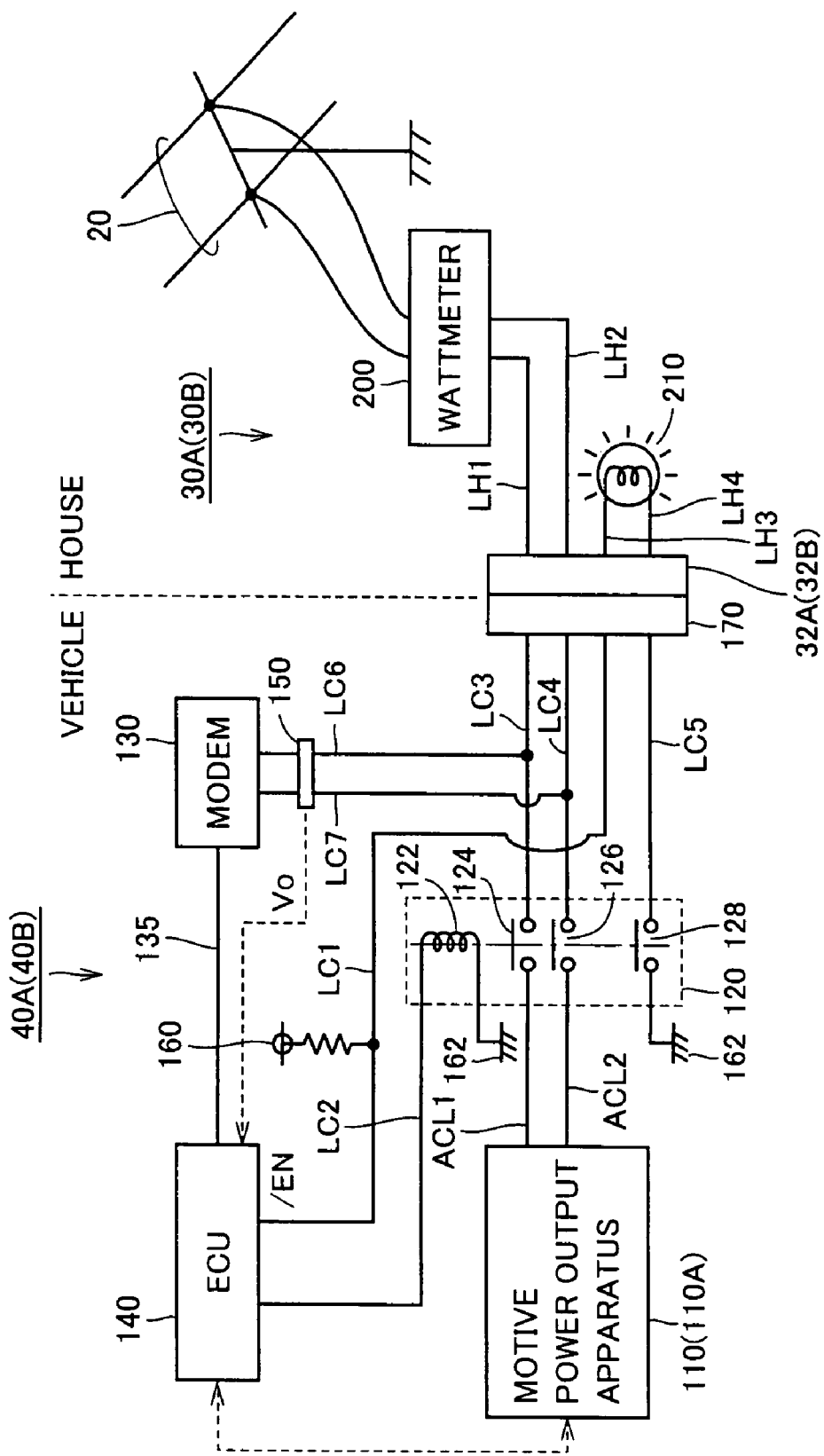
FIG. 2 is a functional block diagram of a vehicle and a house shown in FIG. 1.

FIG. 2 is a functional block diagram of vehicle 40A and house 30A shown in FIG. 1. It is noted that vehicle 40B and house 30B shown in FIG. 1 are structured identically to vehicle 40A and house 30A shown in FIG. 2.

Referring to FIG. 2, vehicle 40A includes a motive power output apparatus 110, a relay circuit 120, a modem 130, a communication cable 135, an ECU (Electronic Control Unit) 140, a voltmeter 150, a power supply node 160, a ground node 162, a connector 170, AC output lines ACL1, ACL2, and electric power lines LC1 to LC7. House 30A includes receptacle 32A, a wattmeter 200, a warning light 210, and electric power lines LH1, LH2.

Motive power output apparatus 110 is connected to AC output lines ACL1, ACL2. Relay circuit 120 is comprised of an electromagnetic coil 122 and switches 124, 126, 128. Electromagnetic coil 122 is connected between electric power line LC2 and ground node 162. Switch 124 is connected between AC output line ACL1 and electric power line LC3. Switch 126 is connected between AC output line ACL2 and electric power line LC4. Switch 128 is connected between electric power line LC5 and ground node 162.

Modem 130 is connected via electric power lines LC6, LC7 respectively to electric power lines LC3, LC4. Further, modem 130 is connected via communication cable 135 to ECU 140. ECU 140 is connected to electric power lines LC1, LC2. Electric power lines LC3, LC4, LC1, LC5 are connected via connector 170 and receptacle 32A to electric power lines LH1 to LH4 respectively.

Wattmeter 200 is provided between electric power lines LH1, LH2 and power transmission line 20. Warning light 210 is connected between electric power line LH3 and electric power line LH4.

Motive power output apparatus 110 generates, according to a torque command from ECU 140, a driving force of this hybrid vehicle. Further, motive power output apparatus 110 generates, according to a generation command from ECU 140, commercial AC power to output the generated commercial AC power to AC output lines ACL1, ACL2.

Electromagnetic coil 122 of relay circuit 120 generates, when electric current is flown from ECU 140 via electric power line LC2, a magnetic force exerted on switches 124, 126, 128. Switches 124, 126, 128 are subjected to the magnetic force from electromagnetic coil 122 to operate in cooperation with each other. Specifically, switches 124, 126, 128 are turned on as electric current is flown through electromagnetic coil 122 and are turned off while no electric current is flown through electromagnetic coil 122.

Modem 130 makes communication between ECU 140 and management server 50 (not shown, which is applied as well to the following description) connected to power transmission line 20. Specifically, receiving data via communication cable 135 from ECU 140, modem 130 outputs the data as received from ECU 140 to management server 50 via electric power lines LC6, LC7, electric power lines LC3, LC4, connector 170, receptacle 32A, electric power lines LH1, LH2, wattmeter 200, and power transmission line 20. Further, modem 130 outputs data as received from management server 50 via power transmission line 20, wattmeter 200, electric power lines LH1, LH2, receptacle 32A, connector 170, electric power lines LC3, LC4 and electric power lines LC6, LC7, to ECU 140 via communication cable 135.

ECU 140 generates the torque command for a motor generator (hereinlater described) included in motive power output apparatus 110, when connector 170 is not connected to receptacle 32A and the vehicle can run, and outputs the generated torque command to motive power output apparatus 110.

Further, ECU 140 starts vehicle 40A, when connector 170 is connected to receptacle 32A and ECU 140 receives the start command from management server 50 through modem 130. It is noted that vehicle 40A is started for example as if the ignition switch is turned to the ON position (to energize the whole hybrid system).

Furthermore, receiving the power generation command from management server 50 through modem 130, ECU 140 supplies electric current to electric power line LC2 to turn on relay circuit 120. When power-generation enable signal /EN with its logical level determined according to a voltage level of electric power line LC1 becomes the L (logical low) level, ECU 140 outputs to motive power output apparatus 110 a command to generate commercial AC power as requested by the power generation command. Specifically, if connector 170 is normally connected to receptacle 32A at the time when switch 128 is turned on, an electrical path is established from power supply node 160 through electric power line LC1, warning light 210, electric power line LC5 and switch 128 to ground node 162. Accordingly, the voltage level of electric power line LC1 is decreased to cause power-generation enable signal /EN to become the L level.

Moreover, receiving the stop command from management server 50 through modem 130, ECU 140 stops outputting the aforementioned command to generate commercial AC power to motive power output apparatus 110. In addition, receiving the start command from management server 50 through modem 130, ECU 140 outputs information concerning this vehicle (vehicle ID number, power generable signal, amount of generated electric power, remaining amount of fuel for example) to management server 50 through modem 130.

Voltmeter 150 detects a voltage of electric power lines LC6, LC7, namely voltage Vo of power transmission line 20 that is electrically connected to electric power lines LC6, LC7, and outputs the detected voltage Vo to ECU 140.

Wattmeter 200 detects an amount of electric power supplied from vehicle 40A to power transmission line 20 to indicate the detected amount of electric power in house 30A. When relay circuit 120 of vehicle 40A is turned on while receptacle 32A is normally connected to connector 170, an electrical path is established from power supply node 160 to ground node 162, so that warning light 210 comes on.

Figure 3:
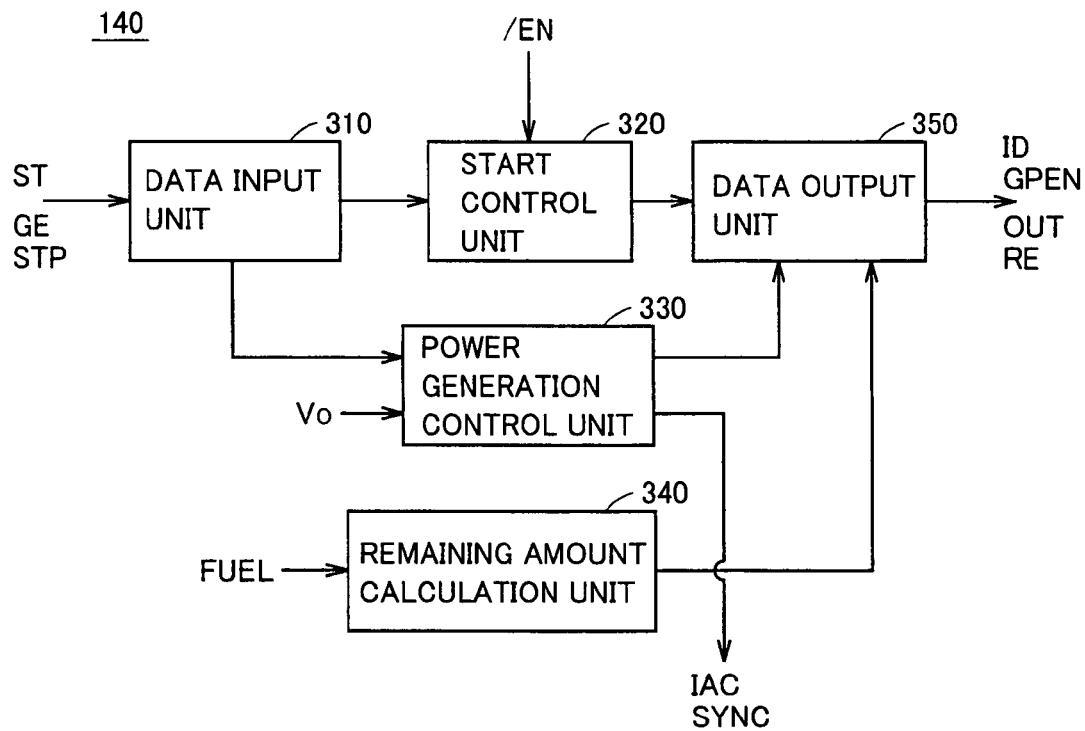
FIG. 3 is a functional block diagram of an ECU shown in FIG. 2.

FIG. 3 is a functional block diagram of ECU 140 shown in FIG. 2. Referring to FIG. 3, ECU 140 is comprised of a data input unit 310, a start control unit 320, a power generation control unit 330, a remaining amount calculation unit 340, and a data output unit 350.

Data input unit 310 receives any of such various commands as start command ST, power generation command GE and stop command STP transmitted through power transmission line 20 to the vehicle from management server 50 of an electric power company through modem 130. Receiving start command ST, data input unit 310 informs start control unit 320 of the fact that it receives the command. Further, receiving power generation command GE, data input unit 310 informs power generation control unit 330 of an amount of electric power to be generated that is specified by this power generation command GE. Furthermore, receiving stop command STP, data input unit 310 informs start control unit 320 and power generation control unit 330 of the fact that it receives the stop command.

Receiving from data input unit 310 the information that start command ST is received from management server 50, start control unit 320 determines, based on power-generation enable signal /EN, whether or not connector 170 is normally connected to receptacle 32A. When start control unit 320 determines that power generation enable signal /EN is L level and that connector 170 is normally connected to receptacle 32A, start control unit 320 starts vehicle 40A. As vehicle 40A is started, start control unit 320 outputs to data output unit 350 the vehicle ID assigned in advance to vehicle 40A as well as power generable signal GPEN.

Further, receiving from data input unit 310 the information that it receives stop command STP from management server 50, start control unit 320 stops vehicle 40A. It is noted that vehicle 40A is stopped for example as if the ignition switch is turned to the OFF position.

Receiving the amount of electric power to be generated that is specified by power generation command GE, power generation control unit 330 generates synchronization signal SYNC that is in synchronization with commercial electric power, based on voltage Vo from voltmeter 150. Further, power generation control unit 330 generates electric current command IAC that is in synchronization with synchronization signal SYNC as generated and according to the specified amount of electric power to be generated. Then, power generation control unit 330 outputs the generated synchronization signal SYNC and electric current command IAC to motive power output apparatus 110.

Furthermore, power generation control unit 330 detects or calculates the amount of electric power generated by motive power output apparatus 110 to output this amount of generated electric power OUT to data output unit 350. In addition, receiving from data input unit 310 the information that it receives stop command STP from management server 50, power generation control unit 330 stops outputting synchronization signal SYNC and electric current command IAC to motive power output apparatus 110.

Based on a signal FUEL received from a fuel tank (described hereinlater) of motive power output apparatus 110, remaining amount calculation unit 340 calculates a remaining amount of generable electric power RE (kwh) which is an amount of electric power that can be generated in the future, and outputs the calculated remaining amount of generable electric power RE to data output unit 350.

Data output unit 350 outputs to modem 130 the vehicle ID and power generable signal GPEN received from start control unit 320, amount of generated electric power OUT received from power generation control unit 330, and remaining amount of generable electric power RE from remaining amount calculation unit 340. Then, each data that is output to modem 130 is transmitted from modem 130 via power transmission line 20 to management server 50 of the electric power company.

Figure 4:
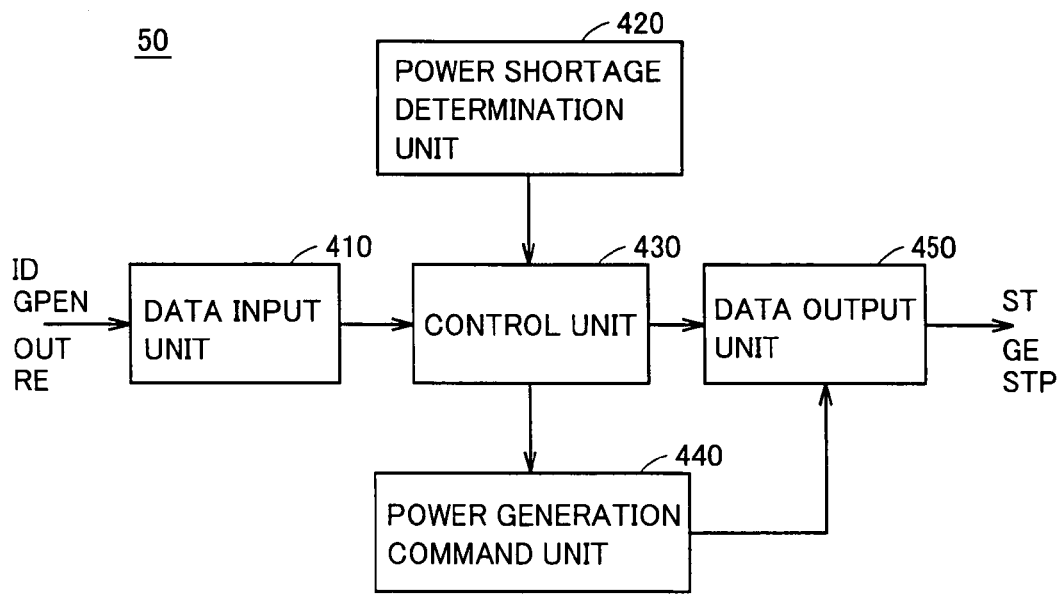
FIG. 4 is a functional block diagram of a management server shown in FIG. 1.

FIG. 4 is a functional block diagram of management server 50 shown in FIG. 1. Referring to FIG. 4, management server 50 includes a data input unit 410, a power shortage determination unit 420, a control unit 430, a power generation command unit 440, and a data output unit 450.

Data input unit 410 receives vehicle information including vehicle ID, power generable signal GPEN, amount of generated electric power OUT and remaining amount of generable electric power RE, from vehicles 40A, 40B via power transmission line 20 and, outputs the vehicle information as received to control unit 430.

Power shortage determination unit 420 determines whether or not electric power shortage occurs, based on the power generation capability as well as an amount of generated electric power of power station 10. When power shortage determination unit 420 determines that the electric power shortage occurs, the determination unit informs control unit 430 of an amount of electric-power shortage.

Receiving the amount of electric-power shortage from power shortage determination unit 420, control unit 430 detects vehicles that can generate electric power at this time, based on vehicle ID and power generable signal GPEN received from data input unit 410. Then, according to the amount of electric-power shortage, control unit 430 selects, from the detected vehicles, a vehicle to be requested to generate electric power, and generates start command ST to be given to the selected vehicle. A criterion for selecting a vehicle to be requested to generate electric power is, for example, remaining amount of generable electric power RE received from each of the vehicles, and vehicles with larger remaining amount of generable electric power RE are selected first. Then, control unit 430 outputs the generated start command ST to data output unit 450.

Further, based on amount of generated electric power OUT and the remaining amount of generable electric power RE of the vehicle requested to generate electric power, control unit 430 outputs, to power generation command unit 440, a signal for instructing to generate power generation command GE (including an amount of electric power to be generated) to be given to this vehicle. Moreover, when the electric power shortage is overcome or when remaining amount of generable electric power RE becomes smaller than a reference value that is set in advance for each vehicle, control unit 430 generates stop command STP to output the stop command STP as generated to data output unit 450.

Power generation command unit 440 generates, according to the instruction from control unit 430, power generation command GE based on amount of generated electric power OUT and remaining amount of generable electric power RE, and outputs the generated power generation command GE to data output unit 450.

Data output unit 450 outputs start command ST or stop command STP received from control unit 430 as well as power generation command GE received from power generation command unit 440 to the relevant vehicle via power transmission line 20.

Figure 5:
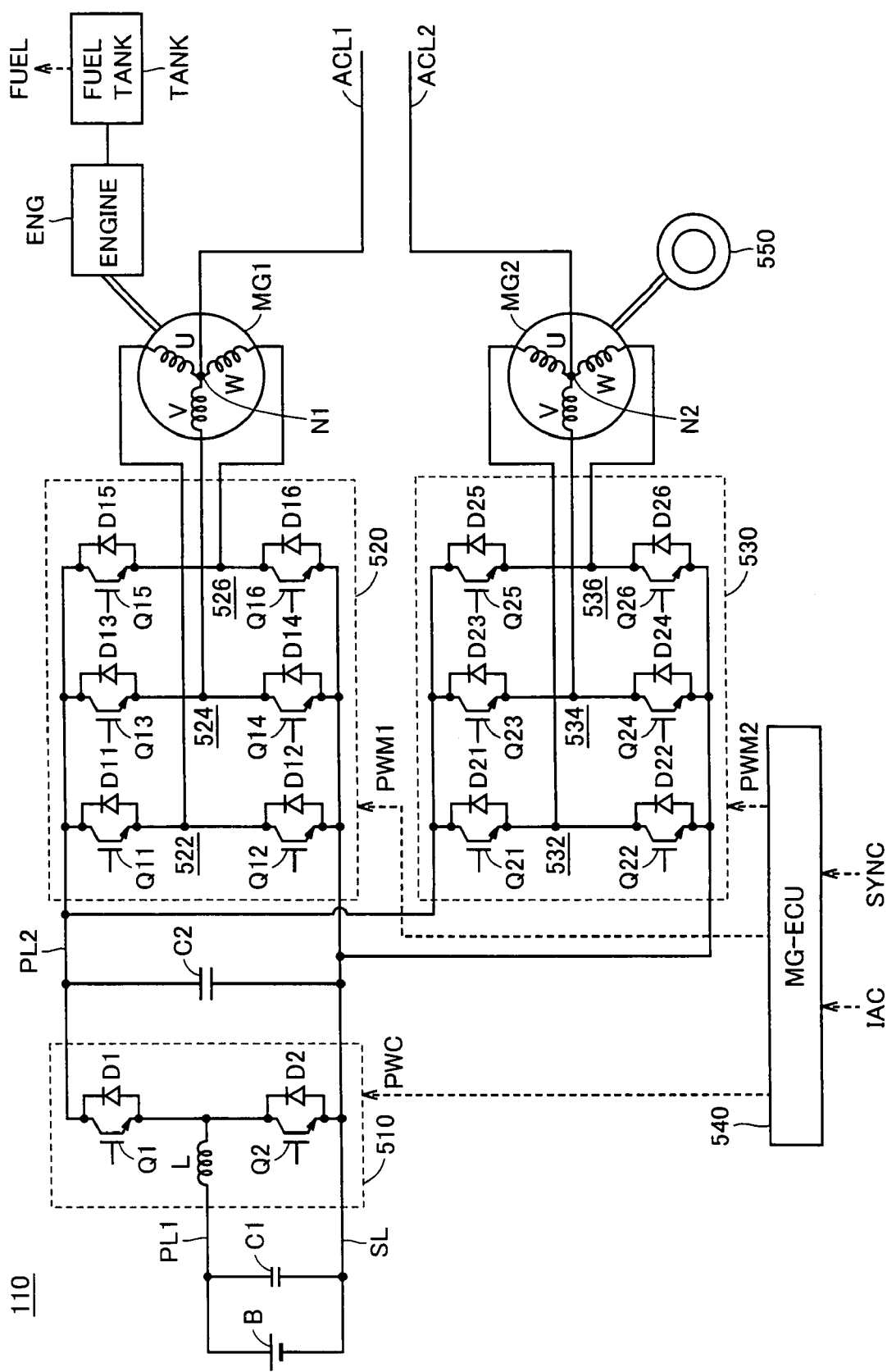
FIG. 5 is an entire block diagram of a motive power output apparatus in FIG. 2.

FIG. 5 is an entire block diagram of motive power output apparatus 110 shown in FIG. 2. Referring to FIG. 5, motive power output apparatus 110 includes a battery B, a voltage step-up converter 510, inverters 520, 530, an MG-ECU 540, motor generators MG1, MG2, an engine ENG, a fuel tank TANK, a drive wheel 550, capacitors C1, C2, power supply lines PL1, PL2, and a ground line SL.

Battery B is connected between power supply line PL1 and ground line SL. Capacitor C1 is connected in parallel with battery B between power supply line PL1 and ground line SL. Voltage step-up converter 510 includes a reactor L, power transistors Q1, Q2 and diodes D1, D2. Power transistors Q1, Q2 are connected in series between power supply line PL2 and ground line SL. Diodes D1, D2 are connected in anti-parallel with power transistors Q1, Q2 respectively. Reactor L is connected between the point of connection between power transistors Q1 and Q2 and power supply line PL1.

Capacitor C2 is connected between power supply line PL2 and ground line SL. Inverter 520 includes a U phase arm 522, a V phase arm 524 and a W phase arm 526. U phase arm 522, V phase arm 524 and W phase arm 526 are connected in parallel between power supply line PL2 and ground line SL. U phase arm 522 is comprised of series-connected power transistors Q11, Q12, V phase arm 524 is comprised of series-connected power transistors Q13, Q14, and W phase arm 526 is comprised of series-connected power transistors Q15, Q16. Diodes D11 to D16 are connected in anti-parallel with power transistors Q11 to Q16 respectively. The point of connection between the power transistors of the U, V and W phase arms each is connected to the other end of coil that is different from one end that is a neutral point N1 of motor generator MG1.

Inverter 530 includes a U phase arm 532, a V phase arm 534 and a W phase arm 536. Inverter 530 is configured similarly to inverter 520. The point of connection between the power transistors of the U, V and W phase arms each is connected to the other end that is different from one end that is a neutral point N2 of motor generator MG2.

Engine ENG is coupled via a coupling member to motor generator MG1. Drive wheel 550 is coupled via a drive shaft to motor generator MG2. AC output lines ACL1 and ACL2 are connected respectively to neutral point N1 of motor generator MG1 and neutral point N2 of motor generator MG2.

Battery B is a DC power source and configured with such a secondary battery as nickel-hydrogen battery or lithium-ion battery. Battery B generates a DC voltage to output the generated DC voltage to power supply line PL1. Further, battery B is charged by voltage step-up converter 510. Capacitor C1 smoothes voltage variations between power supply line PL1 and ground line SL.

Based on signal PWC from MG-ECU 540, voltage step-up converter 510 uses reactor L to step up a DC voltage received from battery B and supplies the stepped-up voltage to power supply line PL2. Further, based on signal PWC from MG-ECU 540, voltage step-up converter 510 steps down a voltage of power supply line PL2 to charge battery B. Capacitor C2 smoothes voltage variations between power supply line PL2 and ground line SL.

Inverter 520 converts, based on signal PWM1 from MG-ECU 540, the DC voltage received from power supply line PL2 into a three-phase AC voltage to output the generated three-phase AC voltage to motor generator MG1. Further, inverter 520 converts a three-phase AC voltage generated by motor generator MG1 using power of engine ENG into a DC voltage, and outputs the generated DC voltage to power supply line PL2.

Inverter 530 converts, based on signal PWM2 from MG-ECU 540, the DC voltage received from power supply line PL2 into a three-phase AC voltage to output the generated three-phase AC voltage to motor generator MG2. Further, while the vehicle is in the regenerative breaking mode, inverter 530 converts a three-phase AC voltage generated by motor generator MG2 into a DC voltage to output the generated DC voltage to power supply line PL2.

While MG-ECU 40 receives electric current command IAC and synchronization signal SYNC from ECU 140 (not shown, which is applied as well to the following description), inverters 520, 530 control respective electric potentials of neutral points N1, N2 so as to generate commercial AC power across respective neutral points N1, N2 of motor generators MG1, MG2, based on respective signals PWM1, PWM2 from MG-ECU 540.

Motor generators MG1, MG2 are each a three-phase AC motor generator that is for example a three-phase AC synchronous motor generator. Motor generator MG1 uses power from engine ENG to generate a three-phase AC voltage and output the generated three-phase AC voltage to inverter 520. Further, motor generator MG1 generates a driving force from a three-phase AC voltage received from inverter 520, so as to start engine ENG. Motor generator MG2 generates drive torque for the vehicle from a three-phase AC voltage received from inverter 530. Further, motor generator MG2 generates, when the vehicle is in the regenerative breaking mode, a three-phase AC voltage to output the generated AC voltage to inverter 530.

Engine ENG uses fuel from fuel tank TANK to generate motive power and drive motor generator MG1 by means of the generated motive power. The motive power from engine ENG is also output via a power split device (not shown) to drive wheel 550. Fuel tank TANK supplies fuel to engine ENG. Further, fuel tank TANK outputs signal FUEL indicating an amount of fuel remaining in the tank to ECU 140.

MG-ECU 540 generates, based on torque command values and the motor revolution numbers of motor generators MG1, MG2, the voltage of battery B and the voltage of power supply line PL2, signal PWC for driving voltage step-up converter 510, and outputs the generated signal PWC to voltage step-up converter 510. It is noted that the motor revolution numbers as well as respective voltages of battery B and power supply line PL2 are detected by respective sensors (not shown).

Further, MG-ECU 540 generates, based on the voltage of power supply line PL2 as well as each phase current and the torque command value for motor generator MG1, signal PWM1 for driving motor generator MG1 to output the generated signal PWM1 to inverter 520. Further, MG-ECU 540 generates, based on the voltage of power supply line PL2 as well as each phase current and torque command value for motor generator MG2, signal PWM2 for driving motor generator MG2 to output the generated signal PWM2 to inverter 530. It is noted that each phase current of motor generators MG1, MG2 is detected by current sensors (not shown).

Furthermore, receiving synchronization signal SYNC and electric current command IAC from ECU 140, MG-ECU 540 generates signals PWM1, PWM2 so that commercial AC power that is in synchronization with synchronization signal SYNC as received and that follows electric current command IAC is generated across respective neutral points N1, N2 of motor generators MG1, MG2.

Figure 6:
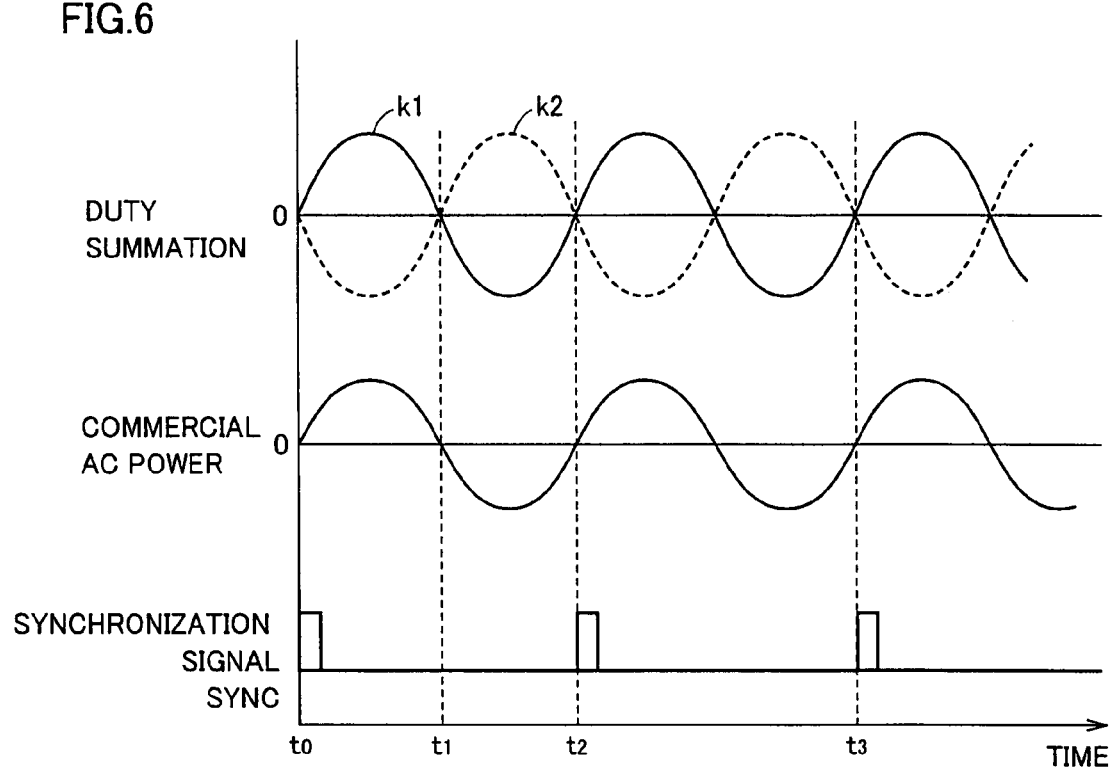
FIG. 6 is a waveform chart illustrating duty summations of inverters and commercial AC power when the commercial AC power is generated across respective neutral points of motor generators shown in FIG. 5.

FIG. 6 is a waveform chart illustrating duty summations of inverters 520, 530 and commercial AC power when the commercial AC power is generated across respective neutral points N1, N2 of motor generators MG1, MG2 shown in FIG. 5. Referring to FIG. 6, curve k1 represents variations of the duty summation of inverter 520 as switching-controlled, and curve k2 represents variations of the duty summation of inverter 530 as switching-controlled. Here, the duty summation is determined by subtracting the on-duty of the lower arm from the on-duty of the upper arm of each inverter. Therefore, in the case where the duty summation is positive, the relevant motor generator has its neutral-point potential higher than an intermediate potential of an inverter input voltage (voltage of power supply line PL2). In the case where the duty summation is negative, the neutral point potential is lower than the intermediate potential of the inverter input voltage.

When commercial AC power is to be generated across neutral points N1, N2, MG-ECU 540 varies the duty summation of inverter 520 according to curve k1 that varies in synchronization with synchronization signal SYNC and at the frequency of the commercial electric power supply, and varies the duty summation of inverter 530 according to curve k2. Here, curve k2 is a phase-inverted version of curve k1. In other words, the duty summation of inverter 530 can be varied periodically with phases opposite to phases with which the duty summation of inverter 520 varies.

Accordingly, in the period of time t0 to time t1, the potential of neutral point N1 is higher than the intermediate potential of the inverter input voltage and the potential of neutral point N2 is lower than the intermediate potential thereof. Thus, a positive AC voltage is generated across neutral points N1, N2. In the following period of time t1 to time t2, the potential of neutral point N1 is lower than the intermediate potential of the inverter input voltage while the potential of neutral point N2 is higher than the intermediate potential thereof, so that a negative AC voltage is generated across neutral points N1, N2.

In this way, an AC voltage having the frequency of the commercial electric power supply is generated across neutral points N1, N2. According to electric current command IAC received from ECU 140, the amplitudes of curves k1, k2 can be controlled to generate, across neutral points N1, N2, the commercial AC power having the frequency of the commercial electric power supply.

It is noted that motive power output apparatus 110 can generate the commercial AC power across neutral points N1, N2 while driving motor generators MG1, MG2. Thus, while motor generator MG1 coupled to engine ENG is driven in the regenerative mode (to generate electric power) and motor generator MG2 coupled to drive wheel 550 is controlled with counteraction (powering drive mode), the commercial AC power can be generated to be supplied to power transmission line 20.

As seen from the above, according to the present embodiment, management server 50 obtains information concerning vehicles 40A, 40B connected to the commercial electric power system (power transmission line 20) via houses 30A, 30B. Then, based on the obtained information about the vehicles, management server 50 can find vehicles 40A, 40B capable of supplying electric power to request to generate electric power. Therefore, when electric power shortage of the commercial electric power system occurs, vehicles 40A, 40B can be used to supply electric power to the commercial electric power system. Accordingly, the shortage of power supply in power station 10 can be made up for.

Further, since modem 130 communicates with management server 50 via an associated house 30A (or 30B) and power transmission line 20, a separate communication-dedicated line is unnecessary. The communication cost can thus be reduced.

Further, vehicles 40A, 40B that are each a hybrid vehicle use the power of the internal combustion engine to generate commercial AC power. When remaining amount of generable electric power RE received from the vehicle is equal to or smaller than a reference value, management server 50 issues an instruction to stop the generation of the commercial AC power. Thus, for the vehicle supplying the commercial AC power, fuel that is necessary for running to the minimum extent is secured so that the vehicle can run at least to the nearest gas station.

It is noted that, according to the embodiment described above, vehicles 40A, 40B are hybrid vehicles each having two motor generators MG1, MG2 mounted on the hybrid vehicle and the commercial AC power is generated across respective neutral points N1, N2 of motor generators MG1, MG2. The prevent invention, however, is applicable as well to a power supply system having an inverter dedicated to generation of commercial AC power.

Furthermore, according to the embodiment described above, vehicles 40A, 40B are hybrid vehicles. Vehicles 40A, 40B, however, may be fuel cell vehicles.

Figure 7:
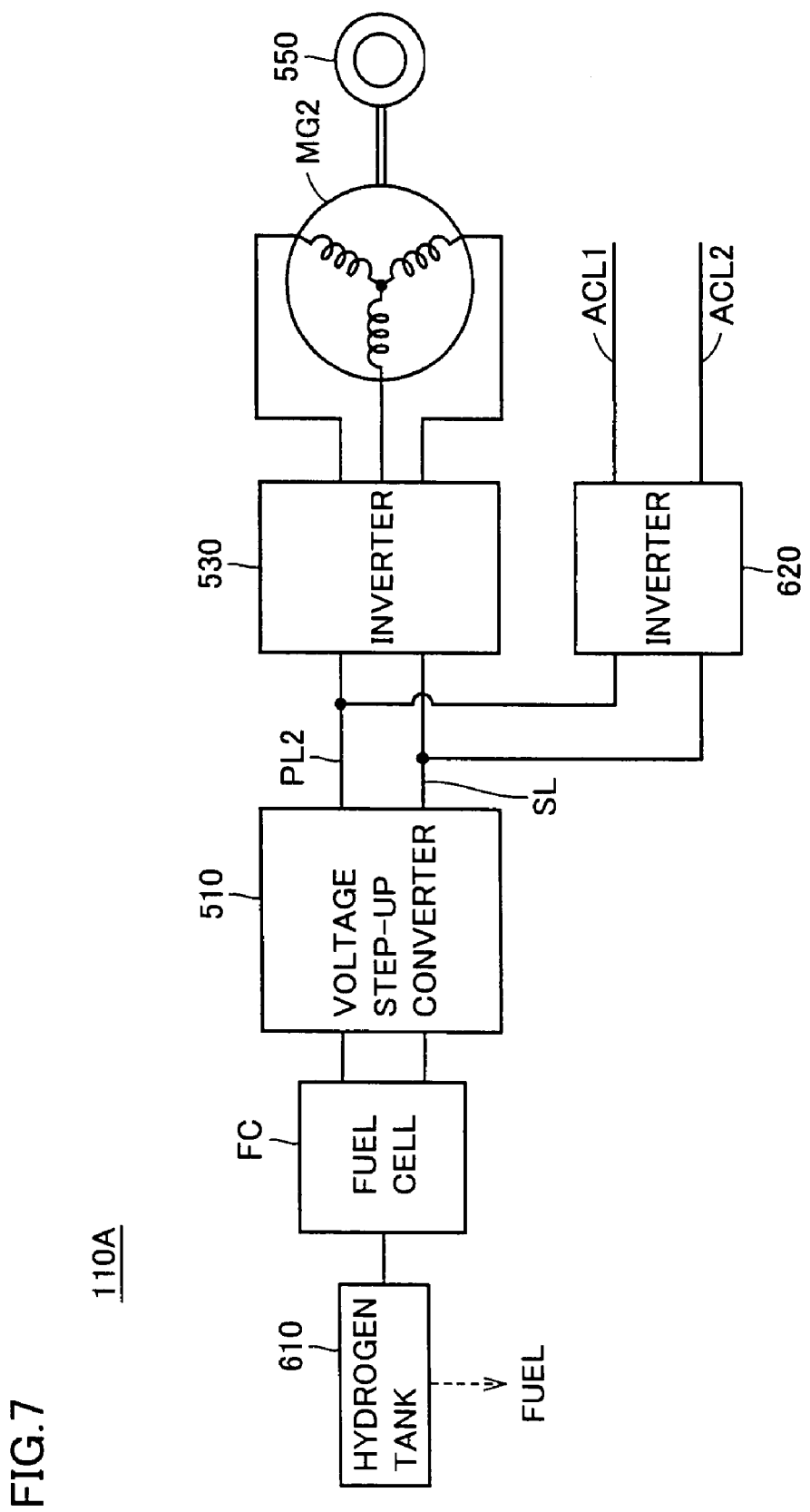
FIG. 7 is an entire block diagram of a motive power output apparatus in the case where the vehicle shown in FIG. 1 is a fuel cell vehicle.

FIG. 7 is an entire block diagram of a motive power output apparatus 110A in the case where vehicles 40A, 40B shown in FIG. 1 are fuel cell vehicles. Referring to FIG. 7, motive power output apparatus 110A is comprised of a fuel cell FC, a hydrogen tank 610, a voltage step-up converter 510, inverters 530, 620, a motor generator MG2, and a drive wheel 550.

Fuel cell FC is a cell generating DC power by using a chemical reaction between hydrogen supplied from hydrogen tank 610 and an oxidizer to convert the resultant chemical energy into electrical energy. Fuel cell FC outputs the generated DC power to voltage step-up converter 510.

Inverter 620 is connected to a power supply line PL2 and a ground line SL. Inverter 620 converts a DC power received from power supply line PL2 into commercial AC power to output the resultant commercial AC power to AC output lines ACL1, ACL2.

Hydrogen tank 610 supplies hydrogen to fuel cell FC. Further, hydrogen tank 610 outputs to ECU 140 (not shown, which is applied as well to the following description) a signal FUEL indicating a remaining amount of hydrogen (e.g. a signal according to the pressure in hydrogen tank 610). ECU 140 calculates, based on signal FUEL from hydrogen tank 610, a remaining amount of generable electric power RE (kwh) which is an amount of electric power that can be generated by this fuel cell vehicle in the future, and outputs the calculated remaining amount of generable electric power RE to a management server 50 of an electric power company, which is not particularly shown in the drawing.

As seen from the above, the electric power supply system of the present invention is applicable not only to the hybrid vehicle but also to the fuel cell vehicle.

Further, while motive power output apparatuses 110, 110A are described as those having voltage step-up converter 510, the present invention is applicable as well to any system that does not have voltage step-up converter 510.

Furthermore, while it is exemplarily described above that two vehicles 40A, 40B are connected to electric power supply system 1, a larger number of vehicles may be connected to electric power supply system 1.

It is noted that, houses 30A, 30B described hereinabove correspond to "at least one connection apparatus" of the present invention, and management server 50 described hereinabove corresponds to "management apparatus" of the present invention. Motive power output apparatuses 110, 110A described hereinabove correspond to "electric power generation apparatus" of the present invention, and modem 130 described hereinabove corresponds to "communication apparatus" of the present invention. Further, ECU 140 described hereinabove corresponds to "control apparatus" of the present invention, and engine ENG described hereinabove corresponds to "internal combustion engine" of the present invention. Furthermore, inverters 520, 530, motor generators MG1, MG2 and MG-ECU 540, or inverter 620 are/is constituent elements/element of "electric power generation unit" of the present invention.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An electric power supply system comprising:
    at least one vehicle capable of generating commercial electric power to supply the generated commercial electric power to the outside of the vehicle;
    at least one connection apparatus provided correspondingly to said at least one vehicle and connecting said at least one vehicle to a commercial electric power system; and
    a management apparatus managing electric power generation by said at least one vehicle connected to said commercial electric power system, wherein
    said at least one vehicle each includes:
    an electric power generation apparatus generating electric power from an energy source that is fuel;
    an electric power generation unit generating, according to a given command, said commercial electric power by using the electric power generated by said electric power generation apparatus;
    a communication apparatus communicating with said management apparatus; and
    a control apparatus outputting to said communication apparatus a command for instructing to transmit information concerning the vehicle to said management apparatus and, according to a request from said management apparatus that is received via said communication apparatus, providing to said electric power generation unit a command for instructing to generate said commercial electric power, said information includes a remaining amount of fuel of said electric power generation apparatus, and when the remaining amount of fuel included in said information becomes equal to or smaller than a predetermined amount, the remaining amount of fuel being included in said information received from the vehicle connected to said commercial electric power system, said management apparatus transmits to the vehicle a command for instructing to stop the generation of said commercial electric power.

2. The electric power supply system according to claim 1, wherein said communication apparatus communicates with said management apparatus via said corresponding connection apparatus and said commercial electric power system.

3. The electric power supply system according to claim 1, wherein said electric power generation apparatus includes:
an internal combustion engine; and
an electric power generator generating electric power by using motive power that is output from said internal combustion engine.

4. The electric power supply system according to claim 1, wherein said electric power generation apparatus includes a fuel cell.

5. The electric power supply system according to claim 1, wherein a plurality of said vehicles are connected to said commercial electric power system, and according to an amount of electric power shortage of said commercial electric power system, said management apparatus selects from said plurality of vehicles a vehicle that is to be requested to supply said commercial electric power.

6. An electric power supply system comprising:

at least one vehicle capable of generating commercial electric power to supply the generated commercial electric power to the outside of the vehicle;

at least one connection means provided correspondingly to said at least one vehicle for connecting said at least one vehicle to a commercial electric power system; and management means for managing electric power generation by said at least one vehicle connected to said commercial electric power system, wherein said at least one vehicle each includes:
electric power generation means for generating electric power from an energy source that is fuel;
an electric power generation unit generating, according to a given command, said commercial electric power by using the electric power generated by said electric power generation means;
communication means for communicating with said management means; and
control means for outputting to said communication means a command for instructing to transmit information concerning the vehicle to said management means and, according to a request from said management means that is received via said communication means, providing to said electric power generation unit a command for instructing to generate said commercial electric power, said information includes a remaining amount of fuel of said electric power generation means, and when the remaining amount of fuel included in said information becomes equal to or smaller than a predetermined amount, the remaining amount of fuel being included in said information received from the vehicle connected to said commercial electric power system, said management means transmits to the vehicle a command for instructing to stop the generation of said commercial electric power.

7. The electric power supply system according to claim 6, wherein said communication means communicates with said management means via said corresponding connection means and said commercial electric power system.

8. The electric power supply system according to claim 6, wherein said electric power generation means includes:
an internal combustion engine; and
an electric power generator generating electric power by using motive power that is output from said internal combustion engine.

9. The electric power supply system according to claim 6, wherein said electric power generation means includes a fuel cell.

10. The electric power supply system according to claim 6, wherein a plurality of said vehicles are connected to said commercial electric power system, and according to an amount of electric power shortage of said commercial electric power system, said management means selects from said plurality of vehicles a vehicle that is to be requested to supply said commercial electric power.

* * * * *